United States Patent [19]

Vooge et al.

[11] Patent Number: 4,705,312
[45] Date of Patent: Nov. 10, 1987

[54] INSULATED BUILDING BLOCK HANDLING TOOL

[76] Inventors: Daryl L. Vooge, 4011 Meadow View Dr., Pasco, Wash. 99301-9486; Jeffery E. Bare, 2505 S. Ledbetter, Kennewick, Wash. 99336

[21] Appl. No.: 922,512

[22] Filed: Oct. 22, 1986

[51] Int. Cl.$^4$ .............................................. B65G 7/12
[52] U.S. Cl. ......................................... 294/62; 294/97
[58] Field of Search ...................... 294/15, 16, 62, 93, 294/95, 97, 115, 117, 158, 164

[56] References Cited

U.S. PATENT DOCUMENTS

| | | | |
|---|---|---|---|
| 405,001 | 6/1889 | Barton | 294/115 |
| 796,642 | 8/1905 | Hall | 294/16 |
| 801,342 | 10/1905 | Schultz | 294/16 |
| 813,060 | 2/1906 | Rowell | 294/16 |
| 824,822 | 7/1906 | Samuelson | 294/16 |
| 830,840 | 9/1906 | Kline | 294/16 |
| 905,010 | 11/1908 | Simmons | 294/16 |
| 1,359,649 | 11/1920 | Allison | 294/93 |
| 1,495,179 | 5/1924 | Hoffer | 294/16 |
| 2,558,114 | 6/1951 | Williams et al. | 294/97 |
| 2,578,072 | 12/1951 | Kargol | 294/62 |
| 2,657,571 | 11/1953 | Looze | 294/62 X |
| 2,670,233 | 2/1954 | Barchoff | 294/97 |
| 2,761,726 | 9/1956 | Ingram | 294/62 X |
| 2,808,286 | 10/1957 | Lyon | 294/62 |
| 2,821,426 | 1/1958 | Hanner | 294/62 X |
| 2,828,618 | 4/1958 | Doescher | 294/62 X |
| 2,968,510 | 1/1961 | Ellis et al. | 294/62 |
| 3,057,651 | 10/1962 | Lloyd | 294/62 |
| 3,237,979 | 3/1966 | Moody | 294/62 X |
| 4,223,935 | 9/1980 | Rayner et al. | 294/62 X |

FOREIGN PATENT DOCUMENTS

| | | | |
|---|---|---|---|
| 2119205 | 10/1972 | Fed. Rep. of Germany | 294/62 |
| 2653316 | 6/1978 | Fed. Rep. of Germany | 294/97 |
| 968467 | 11/1950 | France | 294/62 |
| 312065 | 12/1955 | Switzerland | 294/62 |

Primary Examiner—Johnny D. Cherry
Attorney, Agent, or Firm—Wells, St. John & Roberts

[57] ABSTRACT

A handling tool for insulated building blocks includes a pair of gripping surfaces that can be inserted within a recess of the block. A movable handle is attached through an actuator mechanism to the gripping surfaces for forceably moving the gripping surfaces apart to engage forcefully and in flushed contact with the end wall surfaces of the block. A guide is provided for substantially centering the gripping surfaces and handles within the block over the block weight and for positioning the gripping surfaces along the end walls to prevent damaging engagement between the gripping surfaces and the insulation layer within the block.

16 Claims, 8 Drawing Figures

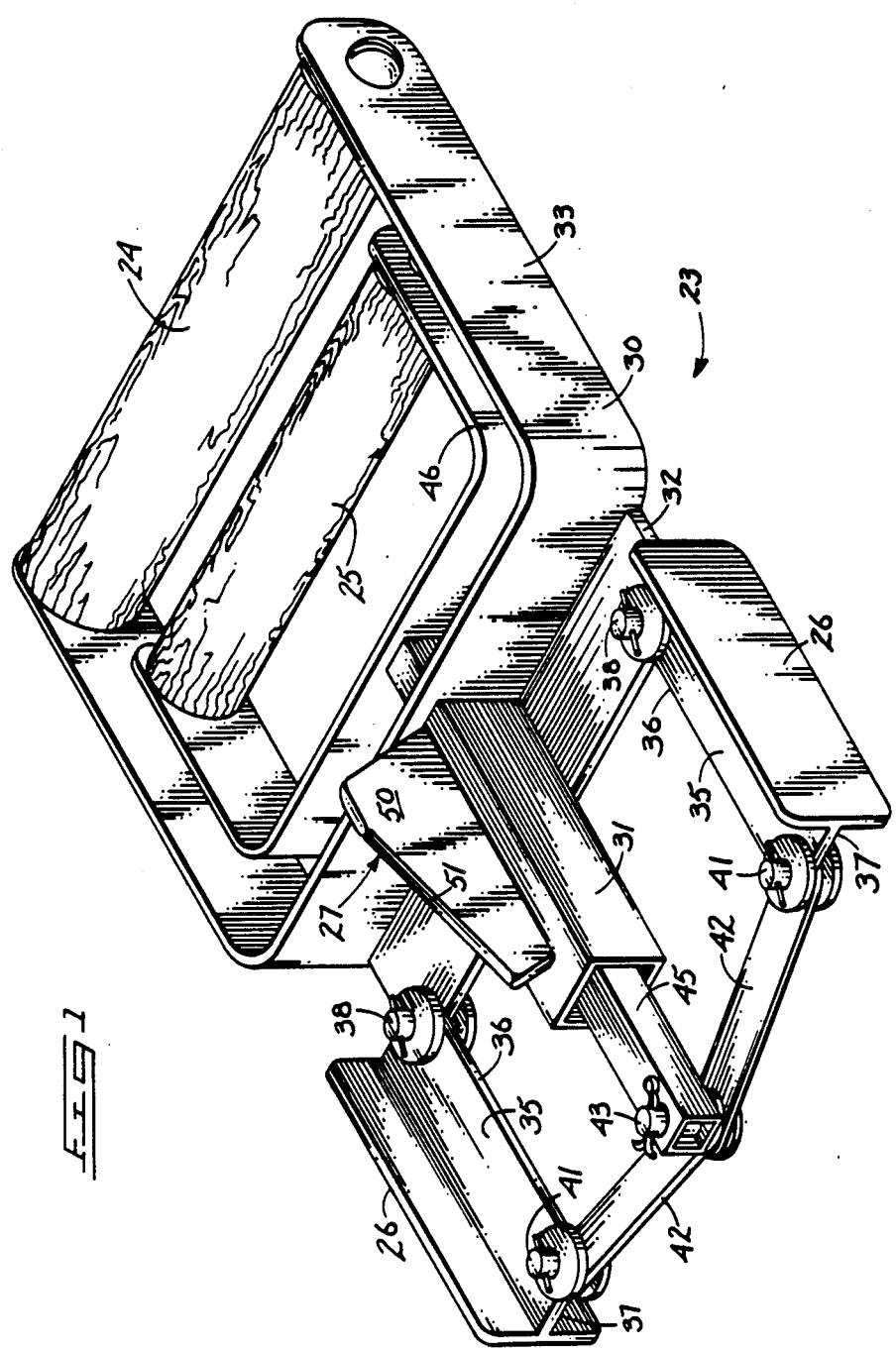

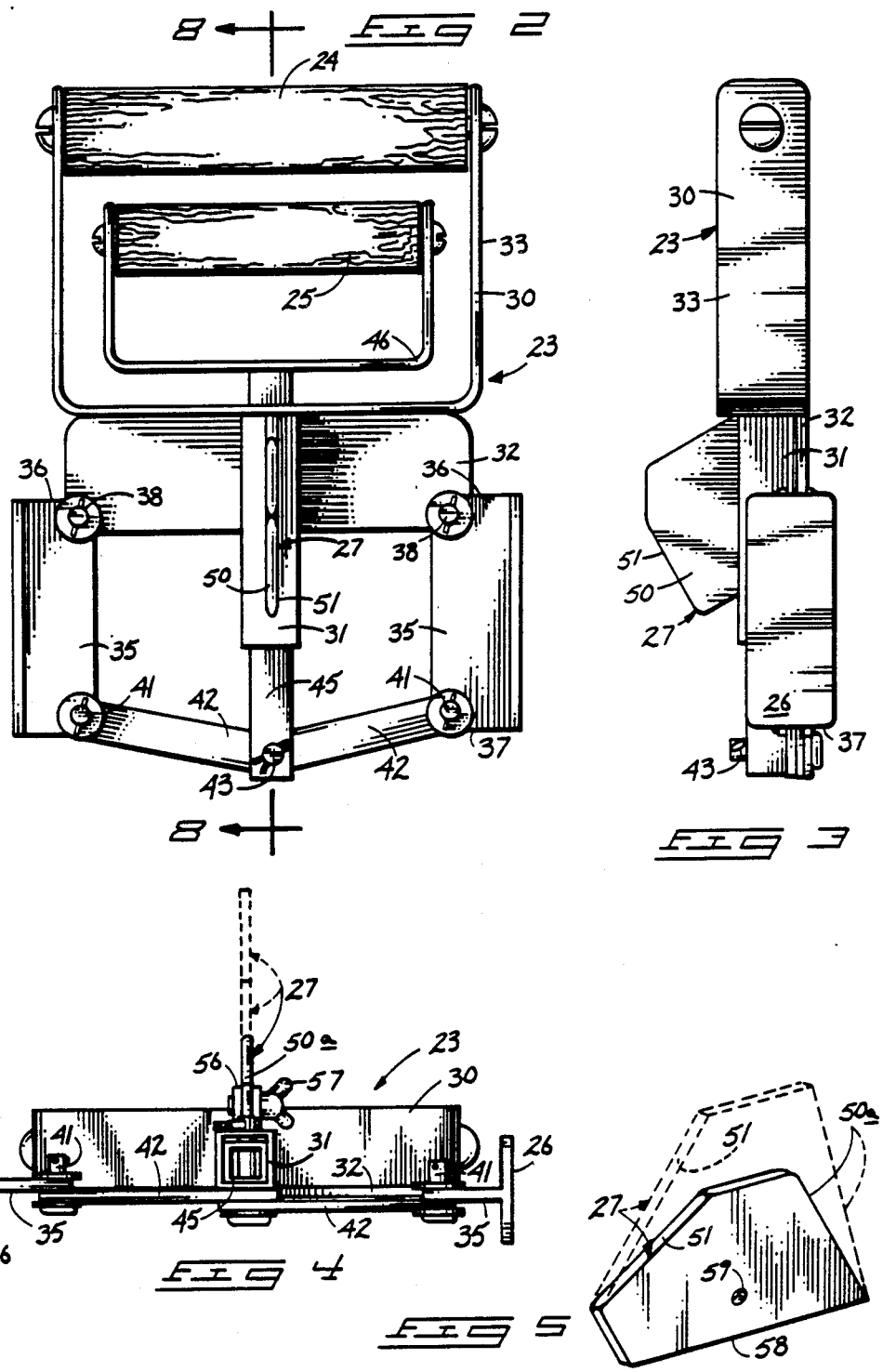

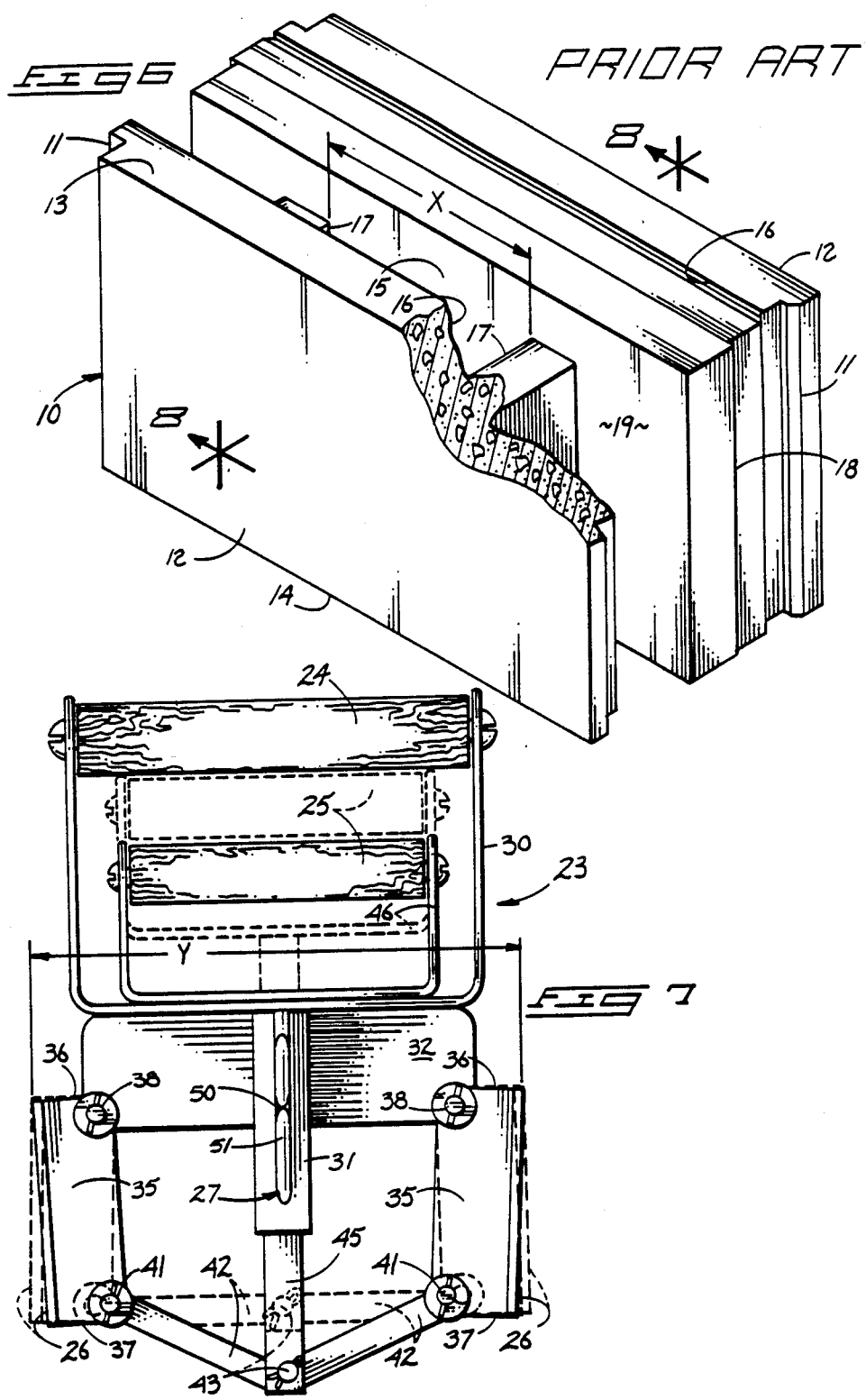

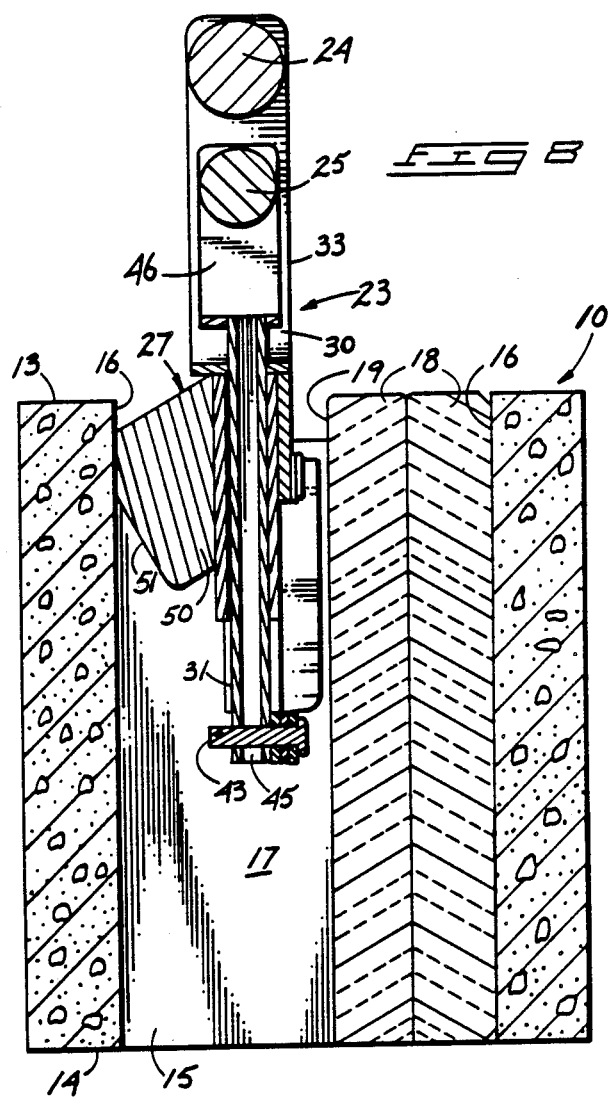

INSULATED BUILDING BLOCK HANDLING TOOL

FIELD OF THE INVENTION

The present invention relates to mechanical gripping of insulated concrete blocks with one inside wall thereof lined with an insulation material, in a manner such that the block can be manually handled without damaging the insulation layer.

BACKGROUND OF THE INVENTION

Fairly recently developed thermally insulated concrete building blocks are being used more frequently in construction. This form of building block combines the advantages of concrete block construction with "built in" thermal insulation properties. The new blocks use layers of rigid foam insulation situated within each block.

The insulation layer is positioned along one side wall of an opening passing through the block. The insulation is fragile and can easily loose its insulative properties if damaged. Extreme care must be taken in handling the blocks to avoid damage to the insulation material. This creates a problem in handling, especially since the insulation layer is usually situated within the block in such a manner that the remainder of the internal block opening is offset. The block can be handled effectively only from sides of the opening clear of the insulation or from outside surfaces if they are to be handled manually.

Manual handling of insulated concrete blocks is difficult for the reason that the blocks are large and heavy and for the fact that they are very awkward to handle due to the placement of the insulation against one of the interior block walls. The blocks therefore require so much added caution by the masons and helpers that installation costs are increased dramatically over standard concrete block construction.

The above problem with increased labor costs, added to the increased costs of the insulated blocks themselves, has often discouraged builders from taking advantage of the rather remarkable insulative properties of this form of block construction.

Attempts have been made to solve the above problem by developing mechanical grabs for handling the blocks.

In confronting general blcok handling problems set forth above, several designs have been developed for use in gripping building blocks from the outside surfaces. For example, U.S. Pat. No. 2,657,571 to Looze, granted in 1953 for a concrete block handling discloses a mechanism by which outside surfaces of concrete blocks are gripped for placement in a wall structure. A somewhat similar arrangement is disclosed in a 1908 U.S. Pat. No. 905,010 to Simmons. Simmons discloses a toggle-actuated grapple for lifting and handling concrete blocks. Both forms of the external grab arrangements have inherent disadvantages. Often, concrete blocks are stacked with external surfaces in abutment with one another. This severely limits access for contact by external gripping mechanisms. Furthermore, external gripping mechanisms often hinder handling of the blocks in situations where there is limited space for the mason or for placement of the block.

Another attempted solution involves grapple or grab apparatus that includes internal mechanisms for engaging and securing the block. Representative of an internal grap mechanism is U.S. Pat. No. 4,223,935 to Rayner et al granted in 1980 for a tool used for lifting building blocks. The tool includes a pair of handles and a block gripping mechanism designed to expand and clamp against internal walls of the block as the handles are manually gripped and lifted. The device includes an abutment surface for engaging a top side of the block and gripping members that extend into an opening within the block from the abutment surface. One of the gripping members is pivoted by a lever mechanism including a hand grip which, when lifted, causes the pivoted member to swing outwardly against a wall of the block. The gripping members are normally parallel to one another and perpendicular to the block engaging abutment surface when in a non-gripping, closed orientation. The gripping members are received within the block recess such that the stationary member will rest flush against a wall surface of the block. The pivoted membermust then be pivoted by action of the lever mechanism from its closed position to an angled, open position for engaging the block at a point or relatively small wall surface area. In another embodiment both members pivot outwardly from outward angled positions so both walls of the block are engaged along small surface areas.

Another internal gripping mechanism is exemplified by U.S. Pat. No. 1,359,649 to Allison issued in 1920 for a lifting device for glass battery jars. Allison includes spring loaded gripping members that operate from a toggle mechanism to internally engage glass battery jars. The members are normally urged to an outward gripping orientation and the toggle mechanism is used to forceably pull the gripping members inwardly to facilitate insertion and removal of the gripping members from open ended glass battery jars.

The above and other forms of gripping devices recognize the need to obtain some form of gripping device that will facilitate one hand handling of building blocks and the like. However, none recognize the problem of using such devices with thermally insulated building blocks. The problem thus remains of adequately handling insulated blocks without endangering the relatively fragile thermal insulation layer.

Some prior gripping devices, such as the Rayner device, have been used with such blocks with only limited success. There has been no provision included to adequately position the gripping members within the block clear of the insulation layer and at a position that substantially centers the gripping handle over the center of weight for the block. Special care must be taken with such forms of gripping apparatus to appropriately position the gripping members within the block in order to avoid damage to the insulation layer. Care must also be taken to properly position the grip so the load will be fairly well balanced. The time required to accomplish this end result often makes use of the tool uneconomical.

A need has therefore remained for a gripping device that includes the capability to position gripping members within the block, safely gripping the block while avoiding the internal insulation layers and simultaneously positioning the handle in relation to the block such that the bulk of the block weight is borne directly below a handle.

BRIEF DESCRIPTION OF THE DRAWINGS

The preferred embodiment of the invention is illustrated in the accompanying drawings, in which:

FIG. 1 is a pictorial view of the present handling tool;

FIG. 2 is an elevation view thereof with gripping surfaces thereof oriented in an operative position;

FIG. 3 is a side view as seen from the right in FIG. 2;

FIG. 4 an end view of a second form of the present device showing adjustment features for varying brick size;

FIG. 5 is a pictorial view of an alternate guide means for the present device, useful in the embodiment shown in FIG. 4;

FIG. 6 is a pictorial view of a conventional insulated building block;

FIG. 7 is a view similar to FIG. 2 only showing the extreme positions of the gripping surfaces; and FIG. 8 is a secontinal view taken through the tool shown in FIG. 2 along line 8—8 therein, the tool being shown within a sectioned block.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present invention deals primarily with lifting and handling of insulated building blocks as generally indicated in FIG. 6 by the reference numeral 10. The block is shown in FIG. 6 with a portion broken away to enable better visual representatin of features that are believed to be important to gain a thorough understanding of the present invention. To this end, a brief description of the component features of the block is in order.

The block 10 is preferably formed of concrete and may be produced in several standard sizes. The block is elongated and includes opposed end surfaces 11. Elongated upright side surfaces 12 extend between the ends 11. The block also includes a top surface 13 and an opposed bottom surface 14. A recess 15 extends from open ends on the top and bottom surfaces through the height dimension of the block. Top and bottom edges of the recess may or may not be flush with the top and bottom block surfaces 13, 14. In fact, the form of block shown in FIG. 6 includes internal "webbing" that defines the recess 15 and which is recessed in relation to the top block surface 13. End walls 17 of the recess face one another along the length of the recess.

A distinguishing feature of the block 10 is the provision of one or more insulation layers 18 within the block. The insulation layers 18 are typically formed of a plastic insulation material such as expanded polystyrene beads or foamed polyurethane. Other forms of cellular or non-cellular plastic may conceivably be used for the insulating layer.

Typically, the layer is typically termed "rigid" insulation. The term "rigid" should thus be understood to mean that the material constituting the insulative layer is self-supporting. Actually, this type of insulation is extremely fragile and can be easily damaged by forceful contact. Impact or clamping pressure applied against the insulation can crush the cellular material and severally affect its insulating capability.

The insulating layer 18 is situated between opposed inwardly facing side walls 16 of the recess 15. The layer is situated against one of the walls 16 and includes a surface 19 substantially parallel to and facing the remaining block recess wall 16.

Given the above understanding of a typical insulated block structure, a better understanding may be obtained from the following detailed description of the present invention.

The present invention is embodied within a handling tool generally shown at 23 in the drawings. Two basic forms of the present tool 23 are shown. One form is shown in FIG. 4 and an attachment for that embodiment is shown in FIG. 5. The remaining figures (aside from FIG. 6) show another form of the present tool. Both forms have the same function to facilitate gripping and handling of insulated concrete blocks 10. Variations between the two forms are found in the guide means 27 which is ued for positioning the tool within the block. Components of the two forms are substantially the same and the following description will suffice for both forms. Areas where structure is dissimilar will be separately described.

Generally, the present handling tool of both forms includes a handle 24 which is fixed in relation to a movable handle 25. Both handles are interconnected through a frame and actuator means to a pair of gripping surfaces 26. The second handle 24 and interconnected actuator mechanisms can be utilized to shift the gripping surfaces 26 about pivot axes between gripping and non-gripping positions. A guide means 27 is provided for guiding the gripping surfaces as they are inserted into the block recess 15 closely adjacent to the insulation layer 18.

More specifically, the present handling tool includes a rigid frame 30 mounting the handle 24. The frame 30 includes a tubular guide section 31 that extends downwardly from a yoke or U-shaped section 33 of the frame 30. A cross piece 32 is secured to the guide and U-shaped frame section and extends to opposite sides of the frame.

The gripping surfaces 26 are formed along outward surfaces of elongated bars 35. They include width dimensions less than the width dimension of the recess 15, as shown in FIG. 8. The surfaces are thus receivable within the recess 15 without touching the insulation layer 18.

The bars 35 include top ends 36 and bottom ends 37. Top ends 36 of the bars are secured by pivots 38 to outward ends of the cross piece 32. The pivot axes are substantially parallel to one another and to the elongated flat planar surfaces 26.

Pivots 41 are provided on the bottom ends of the elongated bars. The actuator means includes a pair of links 42 having outward ends pivotably mounted at the lower pivot points 41 on bars 35. The links extend inwardly to connect at a pivot 43 to a plunger 45. Plunger 45 is slidably received within the tubular guide section 31.

Plunger 45 is rigidly secured to the movable handle 25 by a yoke or U-shaped section 46 similar to the stationary U-shaped frame section 33. The plunger is slidably received by the tubular guide section to facilitate linear motion of the plunger between the solid and dashed line positions shown in FIG. 7.

The links 42 respond to linear movement of the plunger by pivoting the surfaces 26 between the solid and dashed line positions also shown in FIG. 7. The links thus operate as a toggle mechanism, forceably moving the gripping surfaces 26 apart as the second handle 25 is lifted. They also allow gravitational movement of the surfaces 26 to their open condition as the handle is allowed to move downwardly in relation to the fixed first handle 24.

It is important to note the distance between surfaces 26 at the top bar ends 36. This distance is labeled in FIG. 7 by the reference character "Y". Distance "Y" may be measured substantially along a plane passing through the axes of pivots 38 from one surface 26 to the opposite surface 26. The distance "Y" is substantially equal to the length of a block opening between opposite end walls 17. This dimension ins indicated in FIG. 6 by the character "X".

With the above dimension "Y", the tool can be positioned within the recess of the block without requiring abutment surfaces on the tool for determining the amount of insertion. The gripping surfaces 26 themselves will come close and often frictionally contact the end walls of the block as the tool is inserted. Subsequent operation of the actuator means forces the gripping surfaces 26 outwardly about pivots 38 to increase the frictionally engaged surface area from the upward ends of the gripping surfaces 26 to the full length of the gripping surfaces 26 between the top and bottom ends. This frictional engagement, plus the expansion forces provided by the toggle mechanism, serve to securely attach the tool to the block. This is done without applying substantial forces to any small areas of the block, to minimize chances that the gripping forces will crack or break the block webbing along surfaces 17.

The guide means 27 is shown in two basic versions in FIGS. 4, 5 and 1, 3, and 8. The guide means 27 may be comprised of a guide plate 50 mounted to the tool, preferably centered between the surfaces 26 along the tubular guide section 31. The guide plate 50 may extend outwardly to present an inclined cam surface 51 for engaging an edge of the block upon insertion of the tool. The plate surface 51 also acts against the engaged edge to position the tool within the opening substantially as shown in FIG. 8. The purpose is two-fold. Firstly, the guide positions the tool within the recess so the gripping surface will not engage or damage the insulation layer 18. It also substantially centers the handles with respect to the weight of the block. This enables greater ease in handling of the individual blocks and placement of the blocks during the construction process.

In the form shown in FIGS. 1, 3, and 8, the guide plate is affixed to the tool frame 30. With this form, individual tools can be produced for block sizes in which the opening across the recess dictates the dimensions of the guide plate. The embodiment shown in FIGS. 4 and partially in FIG. 5 is illustrative of a device in which the guide plate 50a is removable. Several different size guide plates 50a can be interchangeably mounted to the frame to accommodate different size blocks. Appropriate means may be provided for attaching the removable plates to the frame such as the bracket 56 and wing nut assembly 57 shown in FIG. 4. An appropriate aperture 59 may be formed through the plate 50a to receive the bolt of the bolt and wing nut assembly. A long flat edge 58 of the plate can be secured against the adjacent areas of the frame to hold the guide plate in position along with the clamping action of the wing nut and bolt assembly 57.

From the above technical description, operation of the present invention may be easily understood.

Firstly, the tool is selected or the appropriate apertured plate 50a is selected to correspond with the size of insulated block being used. The apertured plate or tool having the appropriate guide plate 50a is selected to match the opening size of the block. Insertion of the gripping surfaces into the block recess will then result in guiding engagement between the guide means 27 and block to center the handles 24, 25 with the gripping surfaces situated adjacent the insulation layer 18.

Insertion of the tool is accomplished by holding the tool by the handle 24 and allowing the remaining handle 25 to remain at rest in its lowermost position as shown in solid lines in FIG. 7. In this position, the plunger 45 is fully extended and the connected links 42 hold the gripping surfaces in the inwardly angled relationship also shown by solid lines in FIG. 7.

The gripping surfaces present a substantially "V" configuration to guide insertion of the surfaces into the recess of the block. The surfaces can be lowered into the recess until top portions of the surfaces 26 being to engage the block end walls 17. As this is happening, the guide means 27 is simultaneously functioning to position the gripping surfaces within the block in close proximity to the insulation layer 18. The guide means 27 and inclined surfaces 26 substantially center the handle in relation to the center of mass or weight for the block.

After the tool is in position within the recess, the user may lift handle 25 upwardly, using the same hand as previously gripped handle 24. This is a substantially vertical motion wherein the plunger 45 is also pulled upwardly by the upwardly moving handle 25. The plunger 45 operates against the "knee" of the toggle created by links 42. The links 42 straighten with respect to one another as the plunger is pulled upwardly, correspondingly swinging the gripping surfaces 26 outward to engage flush against the adjacent wall surfaces 17 of the block.

The outward gripping forces produced by the toggle mechanism is sufficient to securely and frictionally engage the full surface areas of the gripping surfaces 26 flush against the engaged wall surfaces 17 of the block. So long as this force is maintained, sufficient frictional engagement and gripping contact is maintained to enable lifting of the entire block by applying continued upward lifting forces through the user's hand to the second or movable handle 25.

The toggle links 42 and gripping surfaces 26 are arranged so that only an amount of force equal to the weight of the block is required to secure the handle to the block for lifting purposes. That is, the block can be lifted simply by lifting upwardly on handle 25. The amount of outward force operating through the toggle mechanism for securely engaging the block thus becomes a factor of the weight of the block. The heavier the block, the more the outward gripping forces produce through the toggle links 42 against the gripping surfaces and, hence, the grip appropriately strengthens. The tool therefore automatically compensates for block weight so no additional forces are required to separate the gripping surfaces other than the minimum amount of force required to lift the block itself.

The engaged block can be handled fairly easily due to the relative position of the tool in relation to the weight of the block. The handles are appropriately positioned by the guide mechanisms and gripping surfaces so that the weight of the block is fairly centered below the handles. The user may therefore typically use only a single hand to lift the block and position it in relation to a work surface. This is accomplished without involving any frame or obstruction extending beyond the perimeter of the block.

Once the block is appropriately position, the tool can be easily disengaged from the block simply by setting the block to rest in an appropriate position and allowing the handle 25 to move downwardly by gravity. The plunger 45 also then lowers gravitationally, shifting the links 42 downwardly to pull the bottom ends of the gripping surfaces inward. The surfaces 26 thus retract and release the gripping forces previously applied to the end walls of the block. The tool can then be easily withdrawn from the block simply by lifting upwardly on handle 24.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A handling tool for an elongated insulated building block having a central opening of substantially rectangular cross section, including opposed longitudinal side wall surfaces joined by transverse end wall surfaces extending at least partially through the block, and having a layer of insulation within the opening along one of the longitudinal wall surfaces of the opening, the handling tool comprising:
   a tool handle;
   a frame extending from the tool handle;
   a pair of gripping members mounted to the frame for movement relative to one another and having elongated gripping surfaces thereon adapted for substantially flush engagement with the transverse end wall surfaces of the central opening of the insulated building block;
   wherein the gripping surfaces each have a width dimension less than the distance within the block across the central opening between the layer of insulation and the longitudinal side wall surface opposite the layer of insulation such that the gripping surfaces may be inserted into the central opening of the insulated building block adjacent the transverse end wall surfaces thereof without engaging the layer of insulation;
   actuator means on the frame and operatively connected to the gripping members for moving the gripping surfaces relative to one another from a first position wherein the gripping surfaces are spaced to enable insertion of the gripping surfaces into the central opening, to a second position wherein the gripping surfaces are spaced apart to forcibly engage the transverse end wall surfaces of the central opening; and
   guide means on the frame for engaging the longitudinal wall surface of the central opening opposite the layer of insulation and for positioning the gripping surfaces along the transverse end wall surfaces of the central opening adjacent to the layer of insulation and spaced from the longitudinal side wall surface opposite the layer of insulation to substantially center the tool handle with respect to the center of gravity for the insulated building; and
   wherein the gripping members are mounted to the frame for pivotal movement about substantially parallel pivot axes and the actuator means is comprised of manually operable toggle links interconnecting the gripping members at points thereon spaced from their pivot axes.

2. the handling tool of claim 1 wherein the pair of gripping members include top ends which are pivotable mounted to the frame on the substantially parallel pivot axes.

3. The handling tool of claim 1 wherein the actuator means further includes an actuator handle operatively connected to the toggle links and manually movable relative to the tool handle, for operating the toggle links to pivot the gripping surfaces between the first and second positions.

4. The handling tool of claim 3 wherein the gripping members are elongated and include upper and lower ends, and wherein the pivot axes for the gripping members are situated adjacent the upper gripping member ends and the toggle links are connected to the gripping members adjacent the lower gripping member ends.

5. The handling tool of claim 4 wherein the gripping surfaces are spaced apart at the upper ends of the gripping members by a distance approximately equal to the distance measured along the central opening of an insulated building block between the transverse end wall surfaces thereof.

6. The handling tool of claim 1 wherein the guide means is comprised of a plate mounted to the frame and having an outwardly facing inclined surface means for engaging the longitudinal side wall surface of the central opening opposite the layer of insulation and for guiding the gripping surfaces to lateral positions within the central opening adjacent to the layer of insulation.

7. The handling tool of claim 6 wherein the surfaces are pivoted on the frame about parallel pivot axes and wherein plate is situated between the pivot axes of the gripping members; and wherein the gripping members are elongated and include upper and lower ends, with the pivot axes situated adjacent the upper gripping member ends and wherein the actuator means is connected to the gripping members adjacent the lower gripping members ends.

8. The handling tool of claim 7 wherein the actuator means is comprised of:
   an actuator handle;
   an actuator plunger mounting the actuator handle to the frame adjacent the tool handle; and
   wherein the toggle links have first ends pivotably mounted to the plunger and second ends pivotably mounted to the gripping members.

9. The handling tool of claim 8 wherein the actuator handle is situated between the tool handle and upper ends of the gripping members; and
   wherein the toggle links are connected to the plunger and gripping members in such a manner that movement of the actuator handle toward the tool handle will result in corresponding motion of the gripping surfaces to the second positions thereof.

10. A handling tool for an insulated building block of the type having a central opening defined by opposed elongated longitudinal side walls and transverse end walls joining the longitudinal side walls, and with a layer of insulating material situated within the central opening against one of the longitudinal side walls and including an insulation wall facing the opposite longitudinal side wall of the central opening, the handling tool comprising:
   a tool handle;
   gripping means operatively connected to the tool handle for insertion into the central opening and including gripping surfaces having width dimensions less than the distance across the central opening from the insulation wall to the opposite longitudinal side wall;
actuator means for selectively pressing the gripping surfaces against the transverse end walls of the central opening, and
guide means between the gripping surfaces for engaging the block upon insertion of the gripping surfaces into the block opening, to position the gripping surfaces adjacent the insulation wall and along the transverse end walls of the opening and
means for selectively adjusting the guide means to accommodate insulated building blocks having varied size opening widths between the opposite longitudinal side wall and the insulation wall thereof.

11. The handling tool of claim 10 wherein the guide means is comprised of a cam surface situated between the gripping surfaces and wherein the tool handle is positioned relative to the cam surface such that the cam surface will substantially center the tool handle in relation to the center of gravity of the block upon insertion of the gripping surfaces and cam surface into the central opening.

12. The handling tool of claim 11 further comprising a rigid frame mounting the tool handle and wherein at least one of the gripping surfaces is pivotably mounted to the frame on an axis and wherein the actuator means includes means for forcibly pivoting the at least one gripping surface from a first position wherein the at least one gripping surface is pivoted toward the remaining gripping surface to enable insertion of the gripping surfaces into the block central opening, to a second position wherein the at least one gripping surface is pivoted away from the remaining gripping surface to forcibly and frictionally engage an adjacent transverse end wall of the block central opening.

13. The handling tool of claim 10 further comprising a rigid frame mounting the tool handle and wherein at least one of the gripping surfaces is pivotably mounted to the frame on an axis and wherein the actuator means includes means for forcibly pivoting the at least one gripping surface from a first position wherein the at least one gripping surface is pivoted toward the remaining gripping surface to enable insertion of the gripping surfaces into the block central opening, to a second position wherein the at least one gripping surface is pivoted away from the remaining gripping surface to forcibly and frictionally engage an adjacent transverse end wall of the block central opening.

14. The handling tool of claim 13 wherein the gripping surfaces are planar and wherein the pivot axis for the at least one gripping surface is parallel to the planes of the gripping surfaces.

15. The handling tool of claim 14 wherein the gripping surfaces include upper and lower ends and wherein the pivot axis for the at least one gripping surface is situated adjacent to the upper end thereof and wherein a space between the gripping surfaces in a plane passing through the pivot axis and gripping surfaces is substantially equal to the distance between the transverse end walls in the block central opening.

16. A handling tool for an insulated building block of the type having a central opening defined by opposed first and second longitudinal side walls and transverse end walls joining the first and second longitudinal side walls, and with a layer of insulating material situated within the central opening against the first longitudinal side wall and including an insulation wall spaced from the first side wall and facing the second longitudinal side wall across the central opening, the handling tool comprising:
a frame;
a handle on the frame;
gripping means on the frame for insertion into the central opening and including gripping surfaces having width dimensions less than the distance across the central opening from the insulation wall to the second longitudinal side wall;
actuator means operatively connected to the gripping means for selectively spreading the gripping surfaces relative to one another to press them against the transverse end walls of the central opening; and
guide means on the frame between the gripping surfaces for engaging the second longitudinal side wall and leaving the insulation wall untouched upon insertion of the gripping surface into the central opening for transversely positioning the gripping surfaces within the central opening between the insulation wall and the second longitudinal side wall.

* * * * *